R. HUGHES.
LATHE ATTACHMENT.
APPLICATION FILED SEPT. 7, 1911.
1,028,728.
Patented June 4, 1912.
4 SHEETS—SHEET 2.
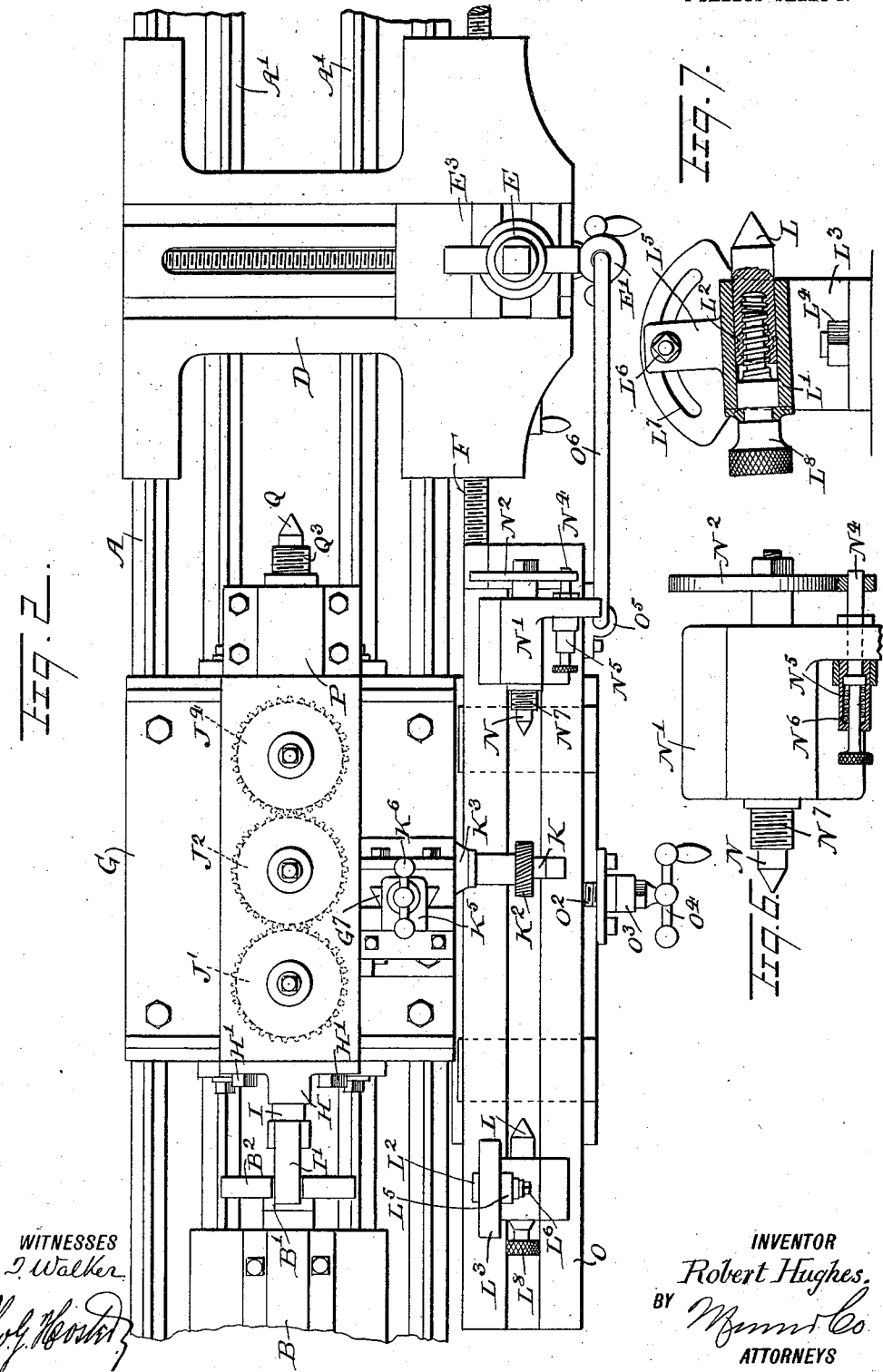
WITNESSES
H. J. Walker
INVENTOR
Robert Hughes.
BY
ATTORNEYS

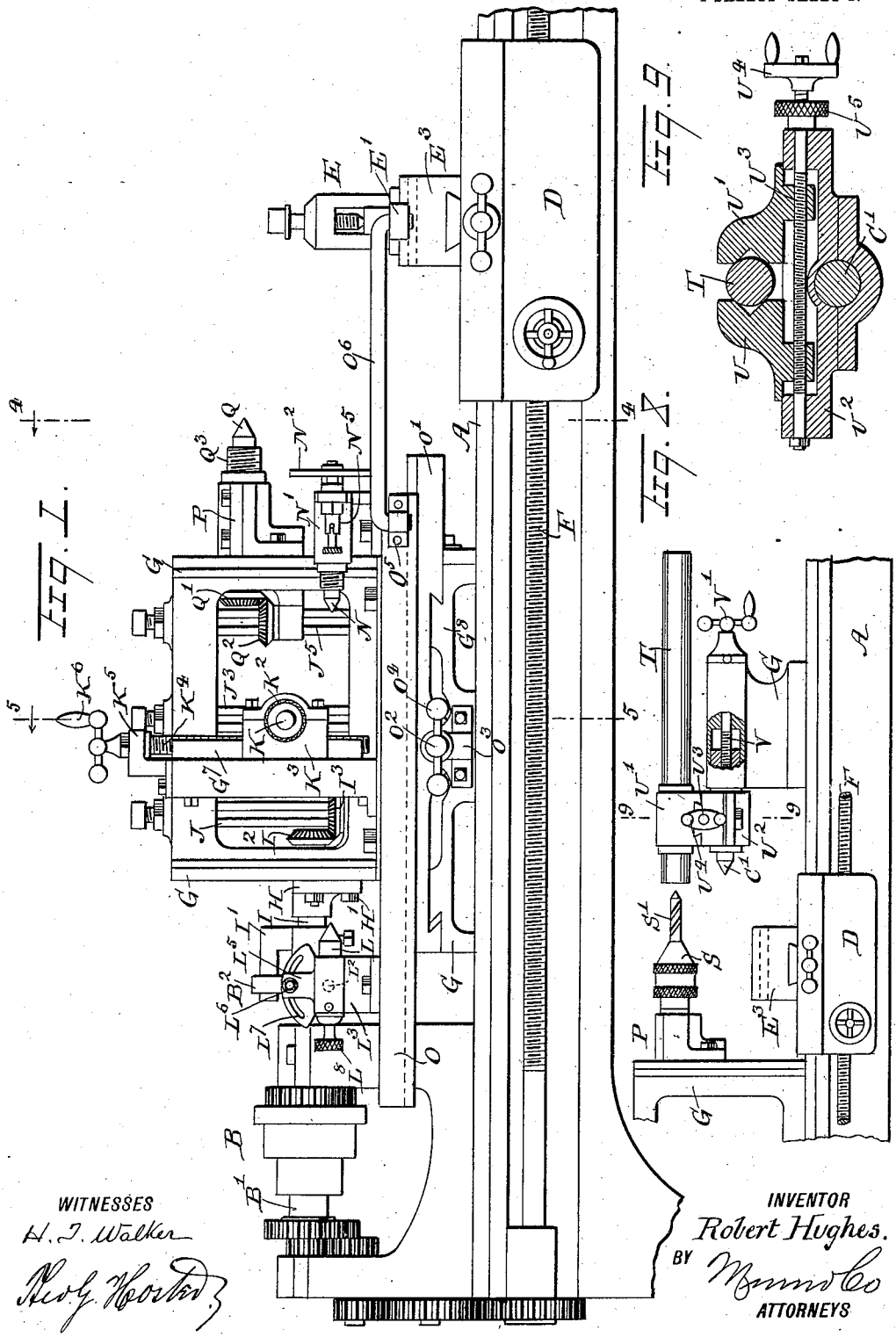

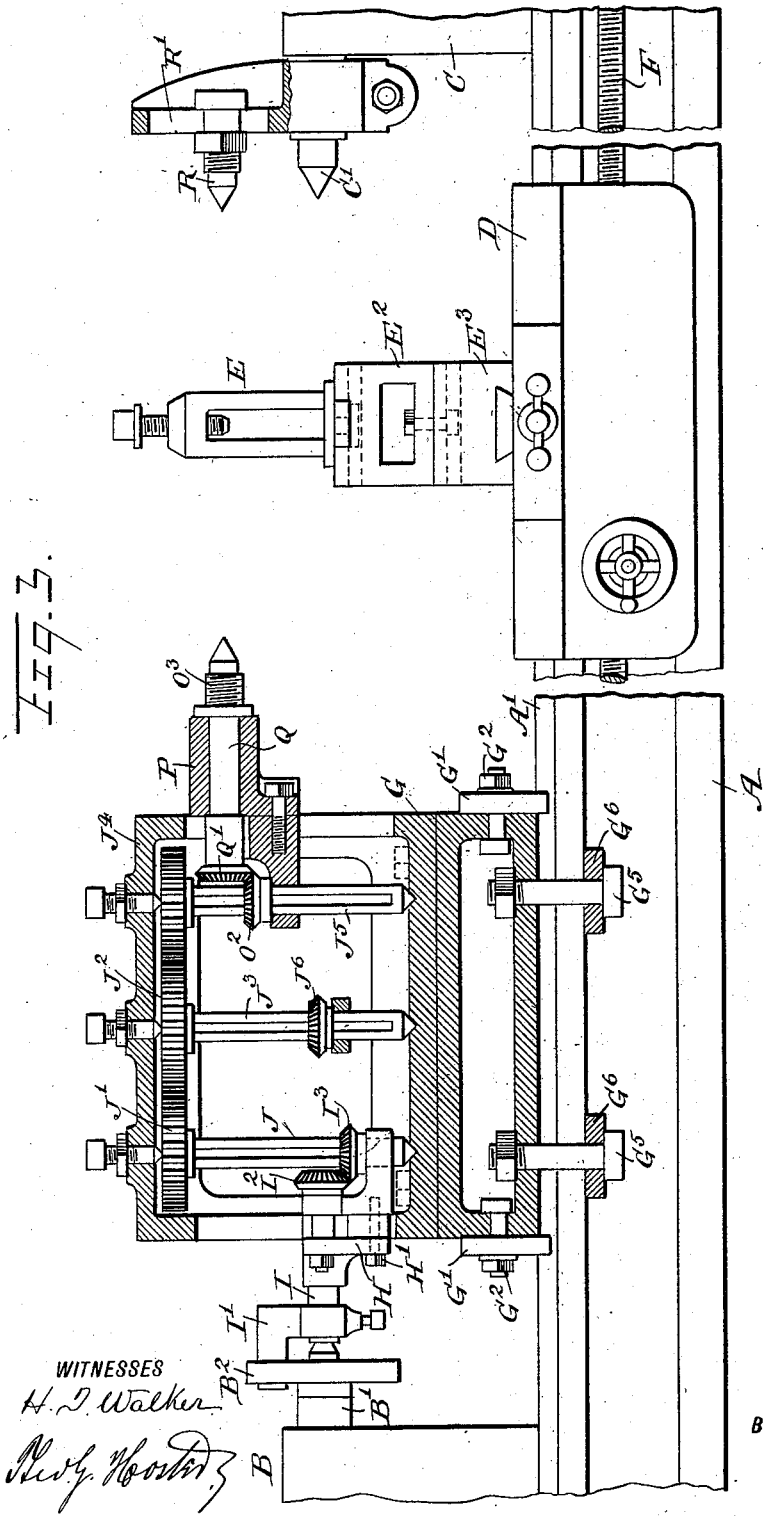

R. HUGHES.
LATHE ATTACHMENT.
APPLICATION FILED SEPT. 7, 1911.
1,028,728.
Patented June 4, 1912.
4 SHEETS—SHEET 4.
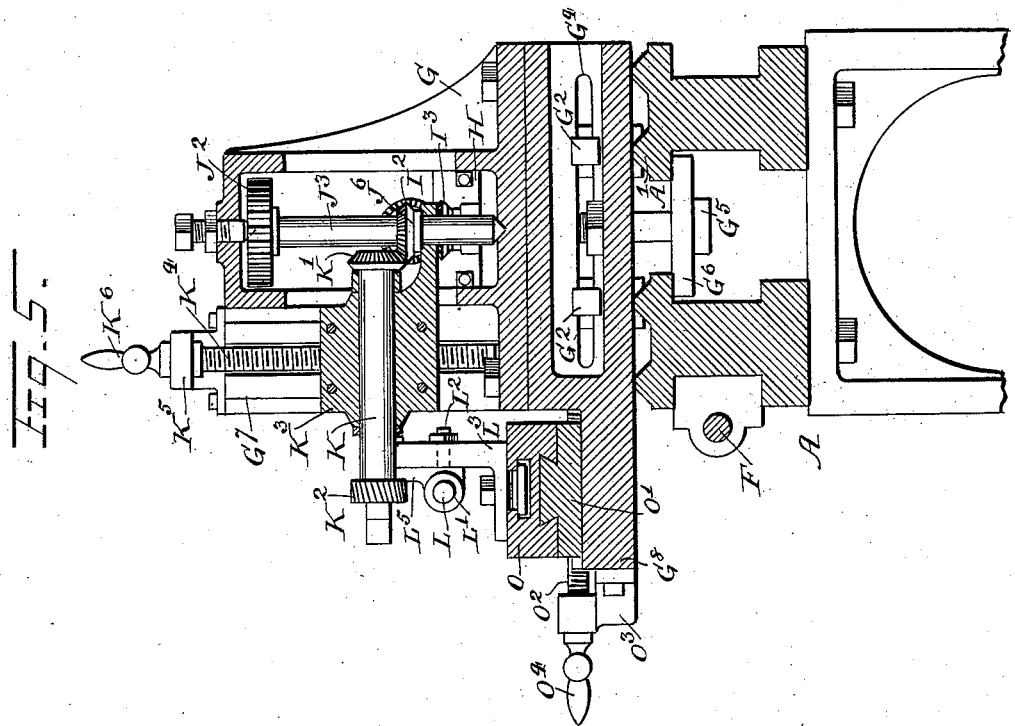
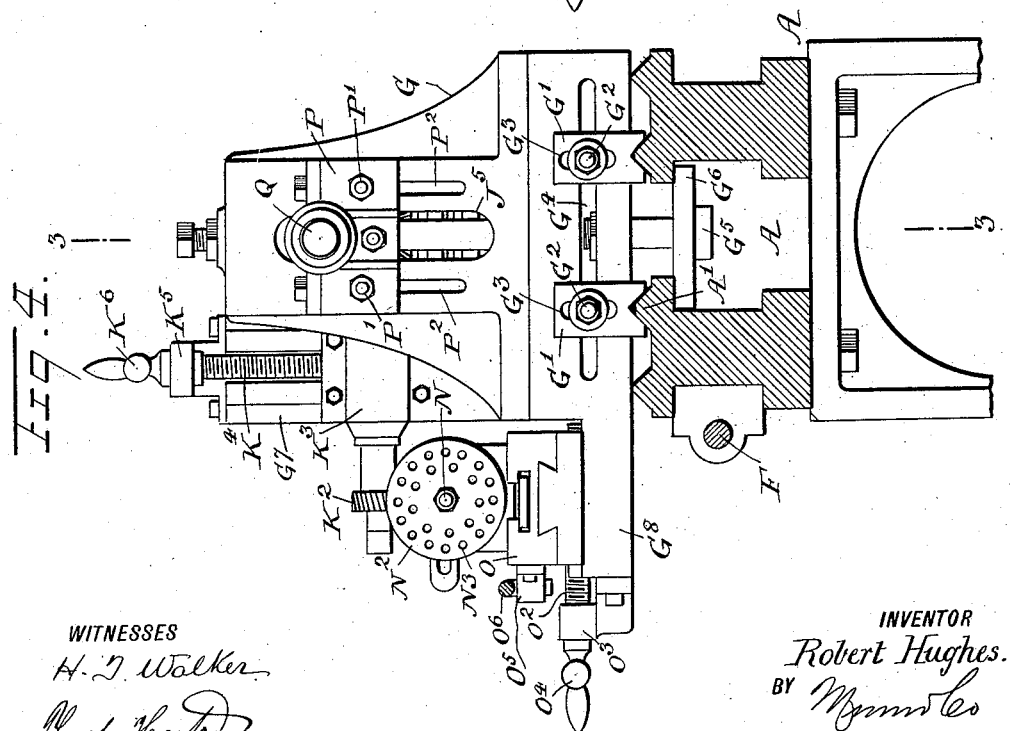
WITNESSES
H. J. Walker
INVENTOR
Robert Hughes.
BY
ATTORNEYS

UNITED STATES PATENT OFFICE.

ROBERT HUGHES, OF MOUNT VERNON, NEW YORK.

LATHE ATTACHMENT.

1,028,728.  Specification of Letters Patent.  Patented June 4, 1912.

Application filed September 7, 1911. Serial No. 648,119.

*To all whom it may concern:*

Be it known that I, ROBERT HUGHES, a citizen of the United States, and a resident of Mount Vernon, in the county of Westchester and State of New York, have invented a new and Improved Lathe Attachment, of which the following is a full, clear, and exact description.

The object of the invention is to provide a new and improved lathe attachment arranged to permit of doing milling or turning work, or both, at the same time, and to increase the swing of the lathe.

For the purpose mentioned use is made of a frame removably attached to the lathe bed and provided with a milling spindle and with a gearing connecting the said milling spindle with the lathe spindle, and a milling table slidable on the said frame and moving with the carriage of the lathe. Use is also made of a vertically adjustable lathe center mounted on the frame and driven from the lathe spindle, and a vertically adjustable auxiliary dead center mounted on the regular dead center of the lathe.

A practical embodiment of the invention is represented in the accompanying drawings forming a part of this specification, in which similar characters of reference indicate corresponding parts in all the views.

Figure 1 is a side elevation of a lathe and the milling and increased swing attachment mounted thereon; Fig. 2 is a plan view of the same; Fig. 3 is a longitudinal central section of the same on the line 3—3 of Fig. 4; Fig. 4 is a cross section of the same on the line 4—4 of Fig. 1; Fig. 5 is a similar view of the same on the line 5—5 of Fig. 1; Fig. 6 is an enlarged plan view, partly in section, of one of the work-holding centers of the milling device; Fig. 7 is an enlarged sectional side elevation of the other work-holding center of the milling device; Fig. 8 is a side elevation, partly in section, of the attachment as arranged for drilling or boring purposes; and Fig. 9 is an enlarged cross section of the same on the line 9—9 of Fig. 8.

The lathe on which the attachment is used consists of the usual bed A, head stock B, spindle B', tail stock C, dead center C' mounted in the tail stock, carriage D carrying the tool post E and the feed screw F for imparting a longitudinal traveling motion to the carriage D. On the bed A of the lathe is adjustably secured a frame G provided with saddles G' engaging the guideways A' of the bed A, the saddles G' being secured in place on the frame G by bolts $G^2$ extending through vertical slots $G^3$ in the saddles G' and through transverse slots $G^4$ formed in the frame G. Bolts $G^5$ held on the frame G engage clamping pieces $G^6$ for clamping the frame G firmly in position on the bed A, after the frame G is moved to the desired position on the bed A. On the left-hand end of the frame G is arranged a bearing H adapted to be moved up or down and fastened in place on the frame G by bolts H', and in the said bearing H is journaled a longitudinally-extending shaft I in axial alinement with the lathe spindle B', the shaft I being driven from the spindle B' by a dog I' secured on the shaft I and engaging the face plate $B^2$ on the spindle B'.

It is understood that the frame G by having the adjustable saddles, bolts $G^5$ and clamping pieces $G^6$ can be readily attached to lathe beds A of different width, and by having the bearing H vertically adjustable on the frame G, the shaft I can be readily brought into axial alinement with the spindle B' of the lathe, and connection can be made between the shaft I and the lathe spindle B' to rotate the shaft I and the lathe spindle B' to rotate the shaft I in unison with the lathe spindle.

The shaft I (see Figs. 1 and 3) is provided with a bevel gear wheel $I^2$ in mesh with a bevel gear wheel $I^3$ mounted to turn with and to slide vertically up and down on a vertical shaft J, journaled in suitable bearings arranged on the frame G. The bevel gear wheel $I^3$ rests on the bearing H so that when the latter is vertically adjusted the bevel gear wheel $I^3$ moves with it and consequently the bevel gear wheels $I^2$ and $I^3$ are at all times in mesh with each other, and when the shaft I is rotated from the lathe spindle then a rotary motion is transmitted to the vertical shaft J. On the upper end of the vertical shaft J is secured a spur wheel J' in mesh with a spur wheel $J^2$ secured on the upper end of a second vertical shaft $J^3$ and the spur wheel $J^2$ is in mesh with a spur wheel $J^4$ secured on the upper end of another vertical shaft $J^5$, both shafts $J^3$ and $J^5$ being journaled in suitable bearings arranged on the frame G.

A bevel gear wheel $J^6$ is mounted to turn with and to slide up and down on the vertical shaft $J^3$, and the said bevel gear wheel $J^6$ is in mesh with a bevel gear wheel $K'$ secured on the rear end of a transversely-extending milling shaft K provided at its forward end with a milling tool $K^2$ of any approved construction. The milling tool K is journaled in a bearing $K^3$ mounted to slide vertically in guideways $G^7$ forming part of the frame G, and the bearing $K^3$ is engaged by a vertically-disposed screw rod $K^4$ mounted to turn in a bearing $K^5$ attached to the top of the guideway $G^7$, and the said screw $K^4$ is provided at its upper end with a handle $K^6$ under the control of the mechanic for turning the screw $K^4$ so as to move the bearing $K^3$ up or down on the guideway $G^7$ thus raising or lowering the milling spindle K. The gear wheel $J^6$ previously mentioned rests on the bearing $K^3$ (see Fig. 5) so as to move with the bearing when the latter is vertically adjustable so that the gear wheels $J^6$ and $K'$ remain at all times in mesh with each other, and when the shaft $J^3$ is turned from the shaft J by the gear wheels $J'$, $J^2$ then a rotary motion is transmitted by the gear wheels $J^6$ and $K'$ to the spindle K and the milling tool $K^2$.

The work to be milled by the milling tool $K^2$ is supported on two centers L and N supported on a milling table O mounted to slide longitudinally on a milling table bed $O'$ mounted to slide transversely on guideways $G^8$ forming part of the frame G, the milling table bed $O'$ being engaged by a screw rod $O^2$ mounted to turn in a suitable bearing $O^3$ attached to the bed $G^8$. A handle $O^4$ is attached to the screw rod $O^2$ to permit the mechanic to turn the screw rod $O^2$ with a view to shift the bed $O'$ and the table O in a transverse direction with a view to bring the work carried by the centers L and N in proper position relative to the milling tool $K^2$. The milling table O is provided with a bearing $O^5$ engaged by one end of a connecting rod or link $O^6$ engaging a bearing $E'$ on the tool post E so that when the carriage D is fed lengthwise on the bed A by the feed screw F then a corresponding movement is given to the milling table O to feed the work carried by the centers L and N lengthwise relative to the milling tool $K^2$.

The center L (see Fig. 7) is mounted in a bearing $D'$ pivoted at $L^2$ on a bracket $L^3$ adjustable on the milling table O, and secured thereto by a clamping screw $L^4$. The bearing $L'$ is provided with an upwardly-extending arm $L^5$ carrying a bolt $L^6$ engaging a segmental slot $L^7$ formed in the bracket $L^3$ so that the bearing $L'$ can be swung in a vertical plane to swing the center L up or down in case it is desired to mill tapering work, it being understood that in this case the center L is swung out of axial alinement with the center N, as will be readily understood by reference to Fig. 7. The center L is moved in the direction of its length in the bearing $L'$ by a screw rod $L^8$ mounted to turn in the bearing $L'$ and screwing in the center L. By the arrangement described the work after being engaged with the center N can be readily engaged with the center L by adjusting the latter in the direction of its length on turning the screw rod $L^8$.

The center N is mounted to turn in a bracket $N'$ held lengthwise adjustable on the milling table, and on the right-hand end of the center N is secured an index plate $N^2$ with apertures $N^3$, any one of which is adapted to be engaged by a locking pin $N^4$ mounted to slide longitudinally in a bearing $N^5$ arranged on the bracket $N'$. A spring $N^6$ presses the locking pin $N^4$ so as to normally hold the same in engagement with one of the apertures $N^3$ with a view to prevent the center N from turning, but when the pin $N^4$ is withdrawn by the mechanic from the index plate $N^2$, then the latter can be turned and with it the center N until another aperture $N^3$ is in register with the pin $N^4$, and when the latter is then released it engages such aperture and locks the index $N^2$ and with it the center N against turning. The center N is provided with a screw thread $N^7$ for screwing on a face plate so that the work supported by the centers L and N can be turned a predetermined distance and then locked in place by the pin $N^4$ during the milling operation.

In order to provide an increased swing the following arrangement is made: On the right-hand side of the frame G is held vertically adjustable a bearing P carrying a live shaft or center Q provided at its inner end with a bevel gear wheel $Q'$ in mesh with a bevel gear wheel $Q^2$ mounted to turn with and to slide up and down on the vertical shaft $J^5$ previously mentioned, the gear wheel $Q^2$ resting on the bearing P so that when the latter is vertically adjusted the gear wheel $Q^2$ moves with it and consequently remains at all times in mesh with the wheel $Q'$. The bearing P is fastened in place on the frame G by bolts $P'$ engaging vertical slots $P^2$ arranged on the frame G (see Fig. 4). The center Q is provided with a screw thread $Q^3$ to permit of attaching a face plate to the live center Q whenever it is desired to do so. It is understood that the bearing P can be lowered on the frame G so as to move the live center Q in axial alinement with the shaft I and the lathe spindle $B'$, but when it is desired to increase the swing of the lathe, the bearing P and with it the live center Q is raised to provide an increased swing of the lathe, it being understood that the live center Q is driven from the shaft J⁵ which in turn is driven from the shaft I rotating in unison with the spindle B'.

In order to support the work with the increased swing of the lathe, it is necessary to provide an auxiliary dead center R held vertically adjustable in a bracket R' clamped or otherwise fastened to the regular dead center C' of the tail stock C (see Fig. 3), and in order to support the tool in the tool post E at the proper height use is made of an auxiliary bed plate E², bolted or otherwise secured to the top of the bed plate E³ of the tool post, and which bed plate E³ is held adjustable in a transverse direction in the usual manner on the carriage D.

By the arrangement described the work to be milled is supported by the centers L and N and moved lengthwise relative to the milling tool K², and the work to be turned is mounted on the centers Q and R and turned by the tool carried by the tool post E moving lengthwise with the carriage D.

It will be noted that either the milling or turning operation can be carried on at a time, or, if desired, both operations can be carried on simultaneously, as the spindle K² as well as the live center Q are driven simultaneously whenever the lathe spindle B' is rotated.

When it is desired to do boring work, as shown in Fig. 8, then a chuck S is screwed on the thread Q³ of the live center Q so that the boring tool S' carried by the chuck S is rotated to engage the work T clamped between the jaws U and U' mounted to slide transversely on a holder U² clamped or otherwise fastened to the dead center C' of the tail stock C. The jaws U and U' are engaged by the right and left hand threaded screw rod U³ mounted to turn in suitable bearings arranged on the holder U², and the outer end of the screw rod U³ is provided with a handle U⁴ under the control of the operator for turning the screw rod U³ with a view to open and close the jaws U and U' (see Fig. 9). In order to feed the work T to the boring tool S' the dead center C' is mounted to slide lengthwise in the tail stock C and is engaged by a screw rod V mounted to turn in the tail stock C and provided at its rear end with a handle V' under the control of the mechanic. Thus when the handle V' is turned the dead center C' is moved lengthwise and with it the holder U², jaws U, U' and the work T to feed the latter toward or from the boring tool S'. The chuck can also be used as a steady rest. When the work is too long to enter between the centers of the lathe, the work is passed through the centering chuck and to the live spindle chuck which holds and turns the work, then the centering chuck becomes a steady rest. The locking nut U⁵ on the screw U³ that operates the jaws is for the purpose of locking the screw when the jaws have been adjusted to the work when using the chuck as a steady rest.

From the foregoing it will be seen that by the arrangement described the attachment can be readily placed in position on a lathe of the usual construction to permit of doing various kinds of milling work, and the swing of the lathe can be increased for doing turning work for which the range of the lathe would not be sufficient.

The attachment is comparatively simple and durable in construction and is not liable easily to get out of order.

Having thus described my invention, I claim as new and desire to secure by Letters Patent:

1. In combination with a lathe, a frame removably attached to the lathe bed, a milling tool mounted to turn on the said frame, a gearing for driving the said milling tool from the lathe spindle, a work holder slidable on the said frame, and a connection between the said work holder and the lathe carriage for moving the work holder in unison with the carriage.

2. In combination with a lathe, a frame removably attached to the lathe bed, a milling tool mounted to turn on the said frame, a gearing for driving the said milling tool from the lathe spindle, a work holder slidable on the said frame and having centers, of which one is provided with an index, and a connection between the said work holder and the lathe carriage for moving the work holder in unison with the carriage.

3. In combination with a lathe, a frame removably attached to the lathe bed, a milling tool mounted to turn on the said frame, a gearing for driving the said milling tool from the lathe spindle, a work holder slidable on the said frame and having centers of which one is adjustable for tapering work, and a connection between the said work holder and the lathe carriage for moving the work holder in unison with the carriage.

4. In combination with a lathe, a frame removably attached to the bed of the lathe, a longitudinal shaft journaled on the said frame in axial alinement with the lathe spindle, means for connecting the shaft with the lathe spindle, vertical shafts journaled on the said frame and geared together, gear wheels connecting one of the said vertical shafts with the said longitudinal shaft, a transverse milling spindle journaled on the said frame, gear wheels connecting the said milling spindle with the other of the said vertical shafts, a milling tool on the said milling spindle, a work holder mounted on the said frame, and a connection between the said work holder and the lathe carriage for moving the work holder longitudinally with the carriage.

5. In combination with a lathe, a frame removably attached to the bed of the lathe, a longitudinal shaft journaled on the said frame in axial alinement with the lathe spindle, means for connecting the shaft with the lathe spindle, vertical shafts journaled on the said frame and geared together, gear wheels connecting one of the said vertical shafts with the said longitudinal shaft, a transverse milling spindle journaled on the said frame, gear wheels connecting the said milling spindle with the other of the said vertical shafts, a milling tool on the said milling spindle, a transverse guideway on the said frame, a milling table bed mounted to slide on the said guideway, a milling table mounted to slide lengthwise on the said milling table bed and provided with work-holding centers, and a link connecting the said milling table with the lathe carriage.

6. In combination with a lathe, a frame detachably secured to the bed of the lathe, a transversely-extending and vertically adjustable milling spindle journaled on the said frame, a lengthwise-extending live center vertically adjustable on the said frame, a longitudinal shaft journaled on the said frame and in axial alinement with the lathe spindle, means for rotating the said shaft from the lathe spindle, and a gearing mounted on the said frame and connecting the said shaft with the said milling spindle and the said live center.

7. In combination with a lathe, a frame detachably secured to the bed of the lathe, a transversely-extending and vertically-adjustable milling spindle journaled on the said frame, a lengthwise-extending live center vertically adjustable on the said frame, a longitudinal shaft journaled on the said frame in axial alinement with the lathe spindle, means for rotating the said shaft from the lathe spindle, and a gearing mounted on the said frame and connecting the said shaft with the said milling spindle and the said live center, a milling table bed adjustable transversely on the said frame, a milling table lengthwise movable on the said milling table bed, a link connecting the said milling table with the lathe carriage, and an auxiliary dead center vertically adjustable on the regular dead center of the lathe.

8. In combination with a lathe, a frame detachably secured to the bed of the lathe, a transversely extending and vertically adjustable milling spindle journaled on the said frame, a longitudinal shaft journaled on the said frame in axial alinement with the lathe spindle, means for rotating the said shaft from the lathe spindle, a gearing mounted on the said frame and connecting the said shaft with the said milling spindle, a milling table bed adjustable transversely on the said frame, a milling table lengthwise movable on the said milling table bed and provided with work holding centers, and a link connecting the said milling table with the lathe carriage.

9. In combination with a lathe, a frame, removably attached to the lathe bed, a vertically adjustable bearing on said frame, a longitudinal shaft journaled in the bearing in axial alinement with the lathe spindle, means for driving the said shaft from the lathe spindle, a vertical shaft journaled on the said frame, bevel gear wheels connecting the said longitudinal shaft with the vertical shaft, the gear wheel on the vertical shaft being mounted to turn with and to slide up and down on said shaft, and resting on the bearing for said longitudinal shaft, a second vertical shaft journaled on the frame and geared with the first-mentioned vertical shaft, a transverse milling spindle, a bearing vertically adjustable on the frame and in which the said milling spindle is journaled, bevel gear wheels connecting the milling spindle with the second vertical shaft, the bevel gear wheel on the second shaft resting on the bearing for the milling spindle and mounted to slide up and down on said second shaft, a milling tool on the said milling spindle, and a work holder mounted on the said frame.

In testimony whereof I have signed my name to this specification in the presence of two subscribing witnesses.

ROBERT HUGHES.

Witnesses:
   THEO. G. HOSTER,
   PHILIP D. ROLLHAUS.

---

Copies of this patent may be obtained for five cents each, by addressing the "Commissioner of Patents, Washington, D. C."